US006912241B2

(12) United States Patent
Giannakis et al.

(10) Patent No.: US 6,912,241 B2
(45) Date of Patent: Jun. 28, 2005

(54) CHIP-INTERLEAVED, BLOCK-SPREAD MULTI-USER COMMUNICATION

(75) Inventors: Georgios B. Giannakis, Minneapolis, MN (US); Shengli Zhou, St. Paul, MN (US)

(73) Assignee: Regents of University of Minnesota, Minneapolis, MN (US)

(*) Notice: Subject to any disclaimer, the term of this patent is extended or adjusted under 35 U.S.C. 154(b) by 765 days.

(21) Appl. No.: 09/838,621

(22) Filed: Apr. 19, 2001

(65) Prior Publication Data

US 2002/0126740 A1 Sep. 12, 2002

Related U.S. Application Data

(60) Provisional application No. 60/274,365, filed on Mar. 8, 2001.

(51) Int. Cl.[7] .............................................. H04B 1/707
(52) U.S. Cl. .................. 375/141; 375/240.27; 714/762; 714/788
(58) Field of Search ............................. 375/140–153; 714/761, 762, 787

(56) References Cited

U.S. PATENT DOCUMENTS

| 5,757,845 | A  | * | 5/1998 | Fukawa et al. ............. 375/152 |
| 6,188,717 | B1 | * | 2/2001 | Kaiser et al. ............... 375/148 |
| 6,377,615 | B1 | * | 4/2002 | Sourour et al. ............. 375/150 |
| 6,438,118 | B1 | * | 8/2002 | Matui .......................... 370/335 |
| 6,574,202 | B1 |   | 6/2003 | Himayat et al. |
| 6,636,723 | B1 | * | 10/2003 | Kitagawa et al. ............. 455/69 |

OTHER PUBLICATIONS

3GPP Technical Report, 3G TR 25.943, "3rd Generation Partnership Project: Technical Specification Group (TSG) RAN WG4; Deployment Aspects," 14 pgs, 1999.

A. Klein, "Data Detection Algorithms Specially Designed for the Downlink of CDMA Mobile Radio Systems," 1997 IEEE 47th Vehicular Technology Conference, Phoenix, AZ, pp. 203–207, May 1997.

A. Klein et al., "Zero Forcing and Minimum Mean–Square–Error Equalization for Multiuser Detection in Code–Division Multiple–Access Channels," IEEE Transactions on Vehicular Technology, vol. 45, No. 2, pp. 276–287, May 1996.

A. Stamoulis et al., "Block FIR Decision–Feedback Equalizers for Filterbank Precoded Transmissions with Blind Channel Estimation Capabilities," IEEE Transactions on Communications, vol. 49, No. 1, pp. 69–83, Jan. 2001.

H.V. Poor et al., "Probability of Error in MMSE Multiuser Detection," IEEE Transactions on Information Theory, vol. 43, No. 3, pp. 858–871, May 1997.

(Continued)

*Primary Examiner*—Stephen Chin
*Assistant Examiner*—Kevin Kim
(74) *Attorney, Agent, or Firm*—Shumaker & Sieffert, P.A.

(57) ABSTRACT

Techniques are described for maintaining the orthogonality of user waveforms in multi-user wireless communication systems, such as systems using the code division multiple access (CDMA) modulation scheme in the presence of frequency-selective fading channels. Unlike conventional systems in which spreading is performed on individual information-bearing symbols, the "chip-interleaved block-spreading" (CIBS) techniques described herein spread blocks of symbols. A transmitter includes a block-spreading unit to form a set of chips for each symbol of a block of information-bearing symbols and to produce a stream of chips in which the chips from different sets are interleaved. A pulse shaping unit within the transmitter generates a transmission signal from the stream of interleaved chips and transmits the signal through a communication channel. A receiver includes a block separator to de-interleave the chips, followed by a match filter to separate signals from different users, and followed by any single-user equalizer.

30 Claims, 9 Drawing Sheets

OTHER PUBLICATIONS

I. Ghauri et al., "Linear Receivers for the DS–CDMA Downlink Exploiting Orthogonality of Spreading Sequences," Procedures of Asilomar Conference on Signals, Systems, and Computers, Pacific Grove, CA, vol. 1, pp. 650–654, Nov. 1998.

K. Hooli et al, "Multiple Access Interference Suppression With Linear Chip Equalizers in WCDMA Downlink Receivers," Global Telecommunications Conference, Rio do Janeiro, Brazil, vol. 1 of 5, pp. 467–471, Dec. 1999.

L. Mailaender, "Low–Complexity Implementation of CDMA Downlink Equalization," 3G Mobile Communication Technologies, pp. 396–400, Mar. 2001.

M. Haardt et al., "The TD–CDMA Based UTRA TDD Mode," IEEE Journal on Selected Areas in Communications, vol. 18 No. 8, pp. 1375–1385, Aug. 2000.

R.G. Vaughan, "Polarization Diversity in Mobile Communications," IEEE Transactions On Vehicular Technologies, vol. 39, No. 3, pp. 177–186, Aug. 1990.

T.P. Krauss et al., "Simple MMSE Equalizers for CDMA Downlink to Restore Chip Sequence: Comparison to Zero–Forcing and RAKE," 2000 IEEE International Conference on Acoustics, Speech, and Signal Processing, vol. V of VI, Istanbul, Turkey, pp. 2865–2868, Jun. 2000.

Wang et al., "Iterative (Turbo) Soft Interference Cancellation and Decoding for Coded CDMA," IEEE Transactons on Communications, vol. 47, No. 7, pp. 1046–1061, Jul. 1999.

Zhou et al., "Chip–Interleaved Block–Spread Code Division Multiple Access," 2001 Conference on Information Sciences and Systems, The Johns Hopkins University, Mar. 21–23, 2001, pp. 1–6.

J.A.C. Bingham, "Multicarrier modulation for data transmission: An idea whose time has come," IEEE Comm. Magazine, pp. 5–14, May 1990.

H.A. Cirpan and M.K. Tsatsanis, "Chip interleaving in direct sequence CDMA systems," in Proc. of Intl. Conf. on ASSP, 1997, vol. 5, pp. 3877–3880.

G.B. Giannakis, Z. Wang, A. Scoglione, and S. Barbarossa, "AMOUR—Generalized Multicarrier Transceivers for Blind CDMA irrespective of Multipath," IEEE Trans. on Comm., vol. 48, No. 12, pp. 2064–2076, Dec. 2000.

G. Leus and M. Moonen, "MUE–Free Receiver for a Shift–Orthogonal Quasi–Synthronous DS–CDMA System Based on Block Spreading in Frequency–Selective Fading," in Proc. of ICASSP, 2000, p. 2497–2500.

G. Leus and M. Moonen, MUI–Free Receiver for a Synchronous DS–CDMA System Based on Block Spreading in the Presence of Frequency–Selective Fading, IEEE Trans. on Signal Processing, vol. 48, No. 11, pp. 3175–3188, 2000.

A. Ruiz, J.M. Cioffi, and S. Kasturia, "Discrete multiple tone modulation with coset coding for the spectrally shaped channel," IEEE Trans. on Comm., vol. 40, pp. 1012–1029, Jun. 1992.

H. Sari and G. Karam, "Orthogonal frequency–division multiple access and its application to CATV network," ETT, pp. 507–516, Nov., 1998.

A. Scaglione, G.B. Giannakis, and S. Barbarossa, "Redundant filterback precoders and equalizers Part 1 & Part II," IEEE Trans. on Signal Processing, vol. 47, pp. 1988–2022, Jul. 1999.

Z. Wang and G.B. Giannakis, "Wireless multicarrier communications: Where Fourier meets Shannon," IEEE Signal Processing Magazine, pp. 29–48, May 2000.

S. Zhou and G.B. Giannakis, "Finite–Alphabet based Channel Estimation for OFDM and related Multi–Carrier Systems," in Proc. of $34^{th}$ Conf. on Info. Sciences and Systems (CISS'00), Mar. 2000.

S. Zhou, G.B. Giannakis, and C. Le Martret, "Chip–Interleaved Block–Spread Code Division Multiple Access", IEEE Trans. on Comm., submitted Augu., 2000.

* cited by examiner

CHIP-INTERLEAVED, BLOCK-SPREAD MULTI-USER COMMUNICATION

This application claims priority from U.S. Provisional Application Ser. No. 60/274,365, filed Mar. 8, 2001, the contents being incorporated herein by reference.

This invention was made with government support under ECS-9979443 awarded by the National Science Foundation. The government has certain rights in the invention.

TECHNICAL FIELD

The invention relates to communication systems and, more particularly, transmitters and receivers for use in multi-user communication systems.

BACKGROUND

In multi-user wireless communication systems, such as mobile phone networks, wireless local area networks and satellite communications, multiple transmitters and receivers may communicate simultaneously through a common wireless communication medium. One communication format widely used by multi-user systems is Code Division Multiple Access (CDMA), in which the transmitters generate orthogonal waveforms that can be separated by the receivers. More specifically, each transmitter applies one code chosen from a set of orthogonal "spreading codes" to an outbound serial stream of "symbols." Each symbol represents a discrete information bearing value selected from a finite set ("alphabet"). For example, simple alphabets used by transmitters may be $\{+1,-1\}$ or $\{-3,-1,+1,+3\}$. The application of the orthogonal spreading codes to the symbols produces a set of "chips" for each symbol to be transmitted. The resulting chips are transmitted according to some modulation scheme, such as quadrature phase shift keying (QPSK) modulation. In order to separate signals from multiple users, the receivers isolate the signal of the desired user by matching the signal to the corresponding orthogonal spreading code.

When the transmission rate increases, the communication medium can become "frequency selective" in that certain frequencies exhibit significant fading, i.e., significant loss of signal. This property often causes inter-chip interference (ICI) in which the transmitted chips for a particular symbol interfere with each other, destroying the orthogonality of the waveforms at the receiver. By rendering the transmitted waveforms non-orthogonal, ICI can lead to multiple user interference (MUI), in which the receivers are unable to correctly separate the waveforms, eventually leading to data loss and/or bandwidth and power inefficiencies.

Various techniques have been developed that attempt to suppress the effects of MUI. For example, various "multi-user detectors" have been developed for separating non-orthogonal user waveforms. These detectors, however, typically use techniques that require knowledge of the characteristics of the current communication medium and that are often complex and expensive to implement in typical mobile communication devices. In addition, alternatives to CDMA have been proposed including multicarrier (MC) spread spectrum based multiple access, e.g., (generalized) MC-CDMA and Orthogonal Frequency Division Multiple Access (OFDMA), where complex exponentials are used as information-bearing carriers to maintain orthogonality in the presence of frequency selective channels. Multicarrier schemes are power inefficient because their transmissions have non-constant magnitude in general, which causes power amplifiers to operate inefficiently. These alternatives can also be very complex and expensive to implement and do not necessarily compensate for channels that introduce significant fading.

SUMMARY

In general, the described invention provides an efficient technique for maintaining the orthogonality of waveforms in multi-user wireless communication systems, such as systems using the code division multiple access (CDMA) communication formats. Unlike conventional systems in which spreading is performed on a per symbol basis, the "block-spreading" techniques described herein operate on blocks of symbols. Furthermore, the resulting chips are interleaved such that the chips generated from any particular symbol are temporally spaced and separated by "guard" chips. In this manner, the symbol-bearing chips and guard chips are transmitted and received in an alternating format.

In one embodiment, the invention is directed to a system in which a transmitter includes a block-spreading unit to form a set of chips for each symbol of a block of information-bearing symbols and to produce a stream of chips in which the chips from different sets are interleaved. A pulse shaping unit within the transmitter generates a transmission signal from the stream of interleaved chips and transmits the signal through a communication channel. A receiver includes a block separator to de-interleave the chips prior to user separation.

In another embodiment, the invention is directed to a transmitting device having a symbol-spreading unit to apply a user-specific orthogonal spreading code to each symbol within a block of symbols, thereby forming chips. A buffer stores the resulting chips in an array and pads the chips with "guard" chips. In one configuration the array comprises M columns and K+L rows, where K is the number of symbols per block, L represents the number of guard chips and is a function of the communication channel length, and M represents a maximum number of users. The buffer stores the chips such that each row in the array contains chips generated from the same symbol. A chip-interleaving unit within the transmitting device reads the chips column-wise from the buffer and outputs a stream of chips in which the chips from different sets are interleaved.

In another embodiment, the invention is directed to a method in which a set of orthogonal spreading codes is applied to a block of information-bearing symbols to form a set of chips for each symbol. Chips from the chip sets are selected in an order that produces a stream in which the chips from different sets are interleaved. A transmission signal is generated from the stream of interleaved chips.

In yet another embodiment, the invention is directed to a computer-readable medium having instructions thereon. The instructions cause a programmable processor to apply a set of orthogonal spreading codes to a block of information-bearing symbols to form a set of chips for each symbol. The instructions cause the programmable processor to select chips from the chip sets to produce a stream of chips in which the chips from different sets are interleaved, and generate a transmission signal from the stream of interleaved chips.

The chip-interleaved block-spread communication techniques described herein offer many advantages. By interleaving the chips generated from blocks of symbols, the transmitter and receiver are resistant to multi-user interference (MUI), regardless of the underlying frequency selective nature of the communication channel and without using adaptive power control to dynamically adjust the usage of power by transmitter. Because the chips generated from a common symbol are temporally spaced and separated by guard chips, interference experienced during propagation through the channel will cause inter-symbol interference, but inter-chip interference is avoided. Therefore, the spreading codes for the various users may remain orthogonal regardless of channel effects.

Other advantages of block spreading include improved bandwidth efficiency, which implies that information can be transmitted at higher rates and that the maximum allowable number of simultaneous users increases. Furthermore, because the waveforms remain orthogonal, the techniques allow receivers to use single-user detectors, which are less complex than multi-user detectors. In other words, the techniques allow receivers to be configured with low complexity detectors that achieve performance equivalent to a set of M single user detectors. The techniques can be easily used with existing code-generation schemes that generate orthogonal spreading codes.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
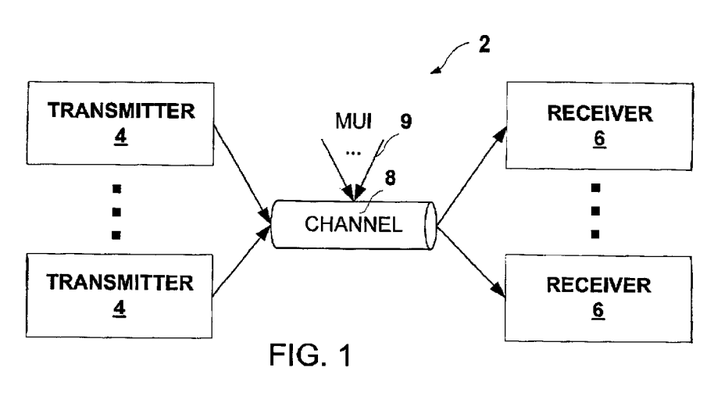
FIG. 1 is a block diagram illustrating a wireless system in which multiple transmitters communicate with multiple receivers through a channel.

FIG. 1 is a block diagram illustrating a multi-user wireless communication system 2 in which multiple transmitters 4 communicate with receivers 6 through wireless channel 8. In general, the invention provides an efficient technique for maintaining the orthogonality of waveforms produced by transmitters 4, thereby suppressing any effects of multi-user interference (MUI) 9 that could otherwise be introduced during transmission through communication channel 8.

Transmitters 4 transmit data using a multi-user spreading scheme referred to herein as "chip-interleaved block-spreading" (CIBS). This scheme can work with existing spreading code generating schemes and, therefore, is backward compatible with a number of conventional multi-user transmission formats including Code Division Multiple Access (CDMA) and Orthogonal Frequency Division Multiplexing (OFDM). The former is an example of single-carrier multiple access scheme, while the latter is a multi-carrier scheme. OFDM has been adopted by many standards including digital audio and video broadcasting (DAB, DVB) in Europe and high-speed digital subscriber lines (DSL) in the United States. OFDM has also been proposed for local area mobile wireless broadband standards including IEEE802.11a, MMAC and HIPERLAN/2.

The techniques described herein apply to uplink and downlink transmissions, i.e., transmissions from a base station to a mobile device and vice versa. Transmitters 4 and receivers 6 may be any device configured to communicate using a multi-user wireless transmission including a cellular distribution station, a hub for a wireless local area network, a cellular phone, a laptop or handheld computing device, a personal digital assistant (PDA), a Bluetooth™ enabled device and the like.

Figure 2:
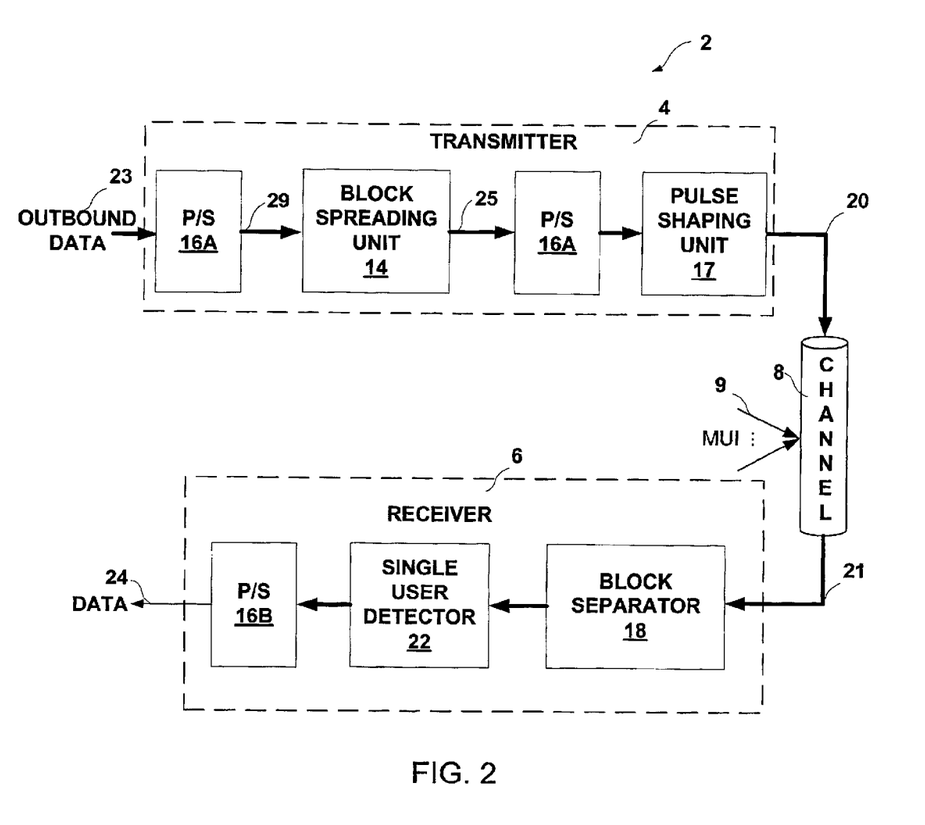
FIG. 2 is a block diagram illustrating in further detail the multi-user communication system of FIG. 1.

FIG. 2 is a block diagram illustrating in further detail the multi-user communication system 2 of FIG. 1. Generally, multiple transmitters 4 corresponding to different users use orthogonal spreading codes to generate transmission waveforms 20 in which the codes remain orthogonal during communication to receiver 6 through channel 8. Serial to parallel (S/P) converter 12A of transmitter 4 parses outbound data 23 from a serial data stream of symbols into blocks of K symbols 29, each symbol representing a discrete information bearing value selected from a finite alphabet.

As described in detail below, CIBS unit 14 applies an a user-specific orthogonal spreading code of length M to each of the symbols to produce a set of "chips" for each symbol, thereby spreading the data for each symbol. CIBS unit 14 may, for example, apply a user-specific spreading code of $\{-1,-1,+1,+1\}$, in which M equals 4. Next, CIBS unit 14 interleaves the chips to produce data stream 25. Parallel to serial (P/S) converter 16A converts the interleaved chip data into a serial bit stream, from which pulse shaping unit 17 forms transmission waveform 20, which is a continuous time signal for carrying the chip-interleaved, block-spread data through channel 8.

Generally, CIBS unit 14 can be viewed as producing P interleaved chips from blocks of K symbols, where P can be determined as follows:

$$P=M*(K+L).$$

L represents a number of spacing chips, referred to herein as "guard" chips, and is determined by the effective length of channel 8 in discrete time, such as 5, 10 or 15 chips long. M represents the length of the user-specific code, i.e., the maximum number of users that can be supported simultaneously.

Receiver 6 receives incoming data stream 21, which typically is a function of transmission waveform 20 and noise introduced by channel 8. Block separator 18 samples data stream 21 and buffers the discrete data by storing the interleaved chips in array form. Block separator 18 selectively outputs blocks of chips that are associated with a common symbol, thereby de-interleaving the chips.

Single user detector 22 receives the de-interleaved chips from block separator 18 and applies a conventional matched filter to separates users based on orthogonality and is followed by a single-user decoding scheme to remove channel effects and output the estimated symbols. Parallel to serial converter 16B converts the stream of symbols produced by single user detector 22 into serial data stream 24. In this manner, the techniques allow transceivers to be configured with low complexity detectors that achieve performance equivalent to a set of M single user detectors.

Figure 3:
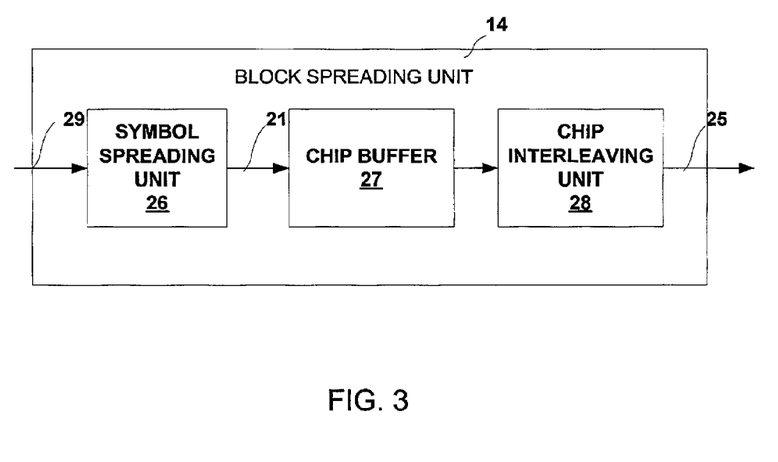
FIG. 3 is a block diagram illustrating an example embodiment of a block-spreading unit within a transmitter.

FIG. 3 is a block diagram illustrating an example embodiment of CIBS unit 14 of transmitter 4. In this embodiment, CIBS unit 14 comprises a symbol-spreading unit 26 that applies a user-specific orthogonal spreading code of length M to an incoming stream of symbols 29. As such, chip buffer 27 and chip-interleaving unit 28 may be used with any conventional symbol-spreading scheme that uses orthogonal spreading codes. Symbol-spreading unit 26 applies a user-specific, spreading code of length M to produce a set of "chips" for each symbol, thereby orthogonally spreading each symbol, where M represents the maximum allowable number of simultaneously communicating users.

Chip buffer 27 receives and stores the chips in array fashion, where each row of the array stores M chips generated from the same symbol. Chip buffer 27 may be a dedicated hardware buffer, random access memory, or any suitable device for storing the chips. After buffering the K rows of M chips, chip buffer 27 pads the information with L rows of "guard" chips (G), where L indicates the effective length of the channel 8 in discrete time, such as 5, 10 or 15 chips long. The guard chips introduce a guard time of length L that can be made arbitrarily negligible as the block size (K) is increased. In one configuration, the guard chips are null (zero) values. In another configuration, the values are drawn from the same modulation constellation as the current symbol, allowing for constant modulus for the output amplifier of transmitter 4, thereby increasing power efficiencies. Thus, in one embodiment, chip buffer 27 stores an array having dimensions of [M, K+L], where M represents the maximum allowable number of simultaneously communicating users, K represents the number of symbols in a block and L represents a number of guard chips. Chip-interleaving unit 28 reads and transmits the chips from chip buffer 27 in column-wise fashion, thereby interleaving the chips to produce output stream 25.

Figure 4:
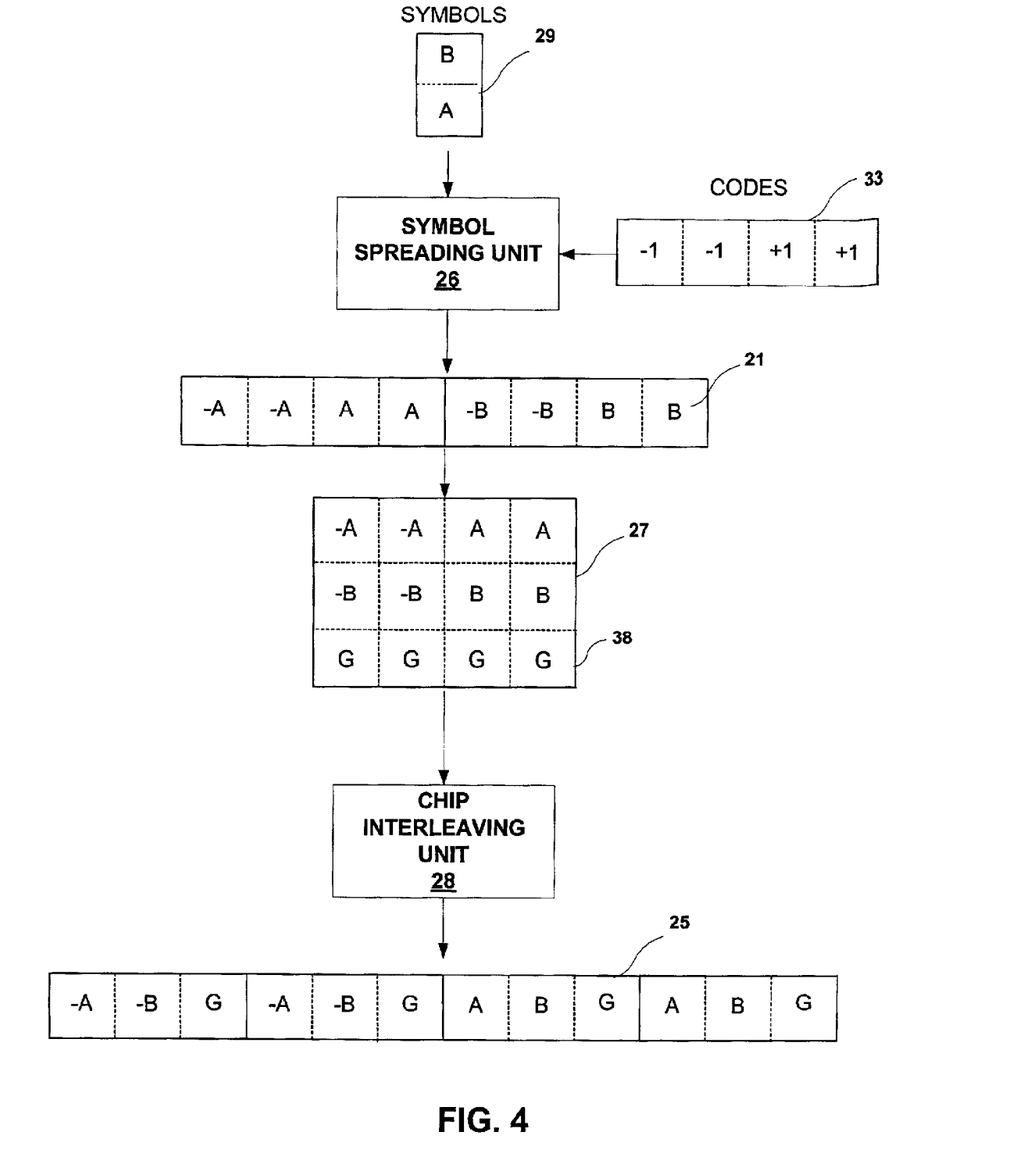
FIG. 4 illustrates an example mode of operation of the block-spreading unit.

FIG. 4 illustrates an example mode of operation of CIBS unit 14 while generating a chip-interleaved block-spread waveform. In this example, input data stream 29 comprises two symbols to be transmitted: {A,B}. Symbol-spreading unit 26 sequentially applies a user-specific orthogonal spreading code 33 of length 4 (M equals 4) to the symbols, to produce chips 21. In this example, symbol-spreading unit 26 applies a spreading code of {−1,−1,+1,+1} to the first symbol {A} of input data stream 29 to produce chips {−A, −A, A, A}. Next, symbol-spreading unit 26 applies spreading code 33 to the second symbol {B} of input data stream 29 to produce chips {−B, −B, B, B}.

Chip buffer 27 receives and stores the generated chips 29 in matrix form. The first two rows of chip buffer 27 store the set of chips generated from symbols A and B, respectively. After storing the chips, chip buffer 27 pads the information with a row of guard chips 38. Chip-interleaving unit 28 extracts data from chip buffer 27 in column-wise fashion, thereby interleaving the coded symbol information to produce output data stream 25. Thus, in this example, the maximum number of simultaneous users (M) equals 4, the blocks of symbols that are spread and interleaved (K) equals 2, and the channel length (L) equals 1.

It can be seen from data stream 25 that the chips for the symbols 29 are interleaved, in that data stream 25 repeats a pattern of chips that includes a chip generated from symbol A, a chip generated from symbol B, and a guard chip. Within a communication cell, every user has a user-specific spreading code that is orthogonal to the spreading codes of the other users. The chip-interleaved block-spreading process can be viewed as using the user-specific spreading code 33 to create "child" orthogonal codes for each symbol in the block. For example, examination of data stream 25 reveals that the child spreading code for the first symbol A can be viewed as {−1,0,0,−1,0,0,+1,0,0,+1,0,0}. Similarly, the child spreading code for symbol B is {0,−1,0,0,−1,0,0,+1, 0,0,+1,0}.

By interleaving the chips corresponding to different symbols within a block of symbols, transmitter 4 and receiver 6 are resistant to multi-user interference (MUI), regardless of the underlying frequency selective nature of channel 8 and without using adaptive power control to dynamically adjust the usage of power by transmitter 4. Interference experience during propagation through the channel may cause intersymbol interference, but interchip interference is avoided because the chips for a given symbol are spaced in time and separated by guard chips. Therefore, the spreading codes for the various users remain orthogonal regardless of channel effects.

Figure 5:
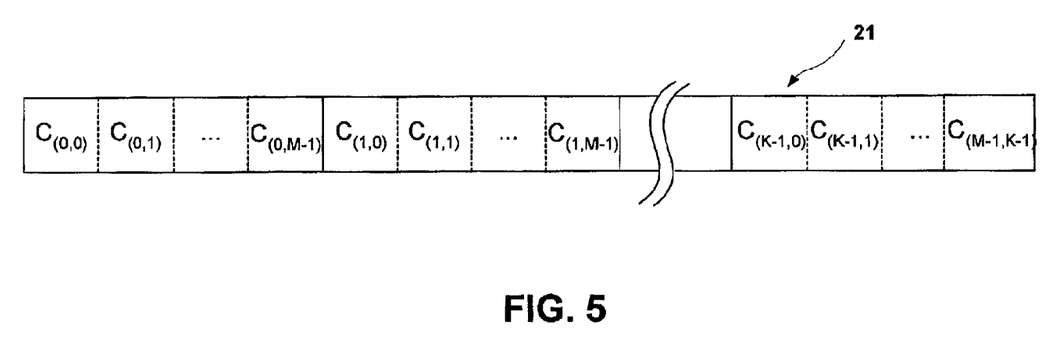
FIG. 5 illustrates an example data stream generated by a symbol-spreading unit within the transmitter.

FIG. 5 illustrates in more detail data stream 21 generated by symbol-spreading unit 26. Data stream 21 includes a sequence of chips, designated as $C_{(k,m)}$, where k identifies a particular symbol within block of symbols and ranges from 0 to K−1, and m identified a particular chip for the user-specific spreading code and ranges from 0 to M−1. As illustrated in FIG. 5, symbol-spreading unit 26 outputs M chips for each of the K symbols within a block of symbols.

Figure 6:
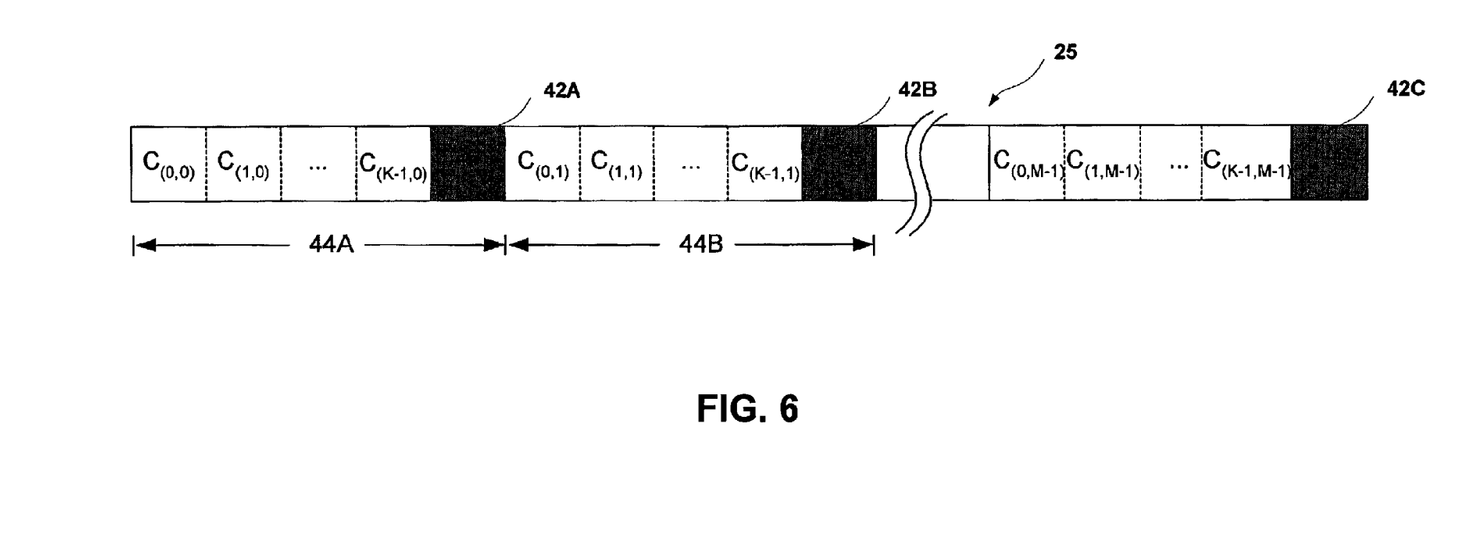
FIG. 6 illustrates an example data stream generated by a chip-interleaving unit within the transmitter.

FIG. 6 illustrates in more detail data stream 25 generated by chip-interleaving unit 28. Data stream 25 includes a sequence of chips, again designated as $C_{(k,m)}$. Chip-interleaving unit 28 produces data stream 25 such that the chips generated from a common symbol are temporally distributed and separated by guard chips 42. For example, a first set of generated chips 44A includes the first chip $D_{(k,0)}$ generated from each of the K symbols, followed by L guard chips 42A. The second set of generated chips 44B includes the second chip $D_{(k,1)}$ generated from each of the K symbols, again followed by L guard chips 42B. This pattern repeats until chip-interleaving unit 28 has extracted all M*(K+L) chips from chip buffer 27 and transmitted the chips via data stream 25.

Figure 7:
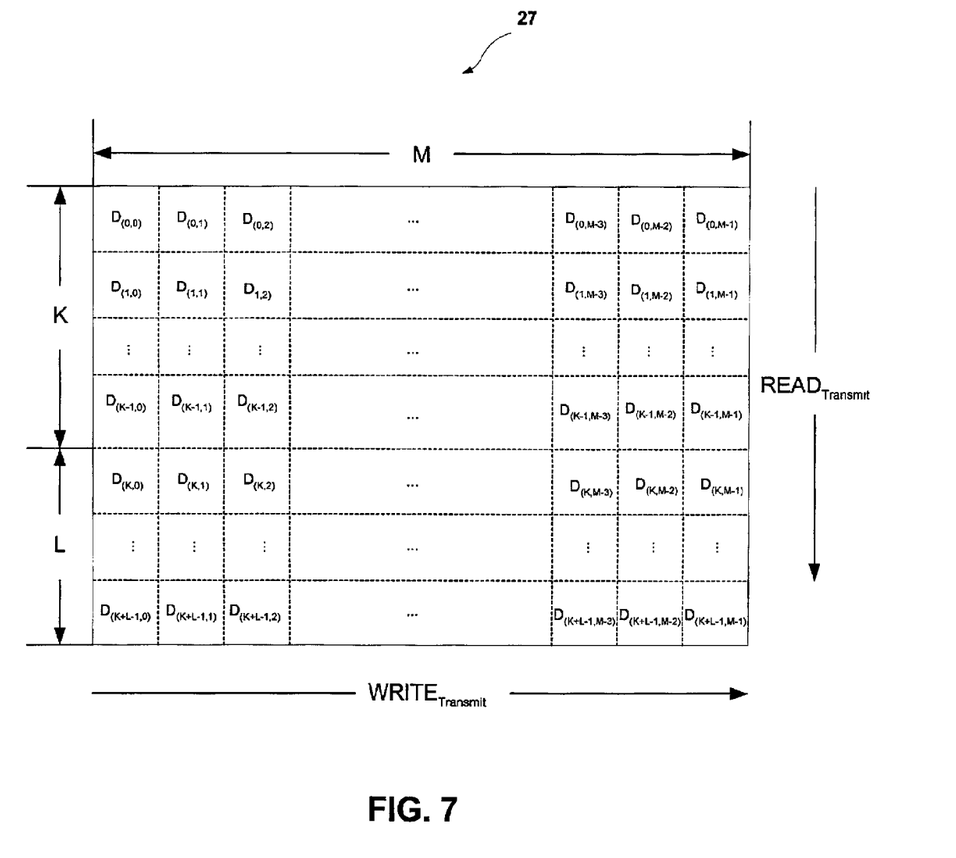
FIG. 7 illustrates an example arrangement of the chips stored within a buffer in array format.

FIG. 7 illustrates an example arrangement of the chips within chip buffer 27. In this arrangement the chips are organized in an array having M columns and K+L rows. Each row within buffer 27 is filled from data stream 21 and stores M chips generated from a common symbol. Chip-interleaving unit 28 read the chips from chip buffer 27 in column wise format in which each column holds K chips, each chip being generated from a unique one of the K symbols, and L guard chips. As discussed above, block separator 18 stores the received chips in a similar array. While receiving the interleaved chips from data stream 21, however, block separator fills the array column by column, and then outputs the data row by row, thereby de-interleaving the chips.

Figure 8:
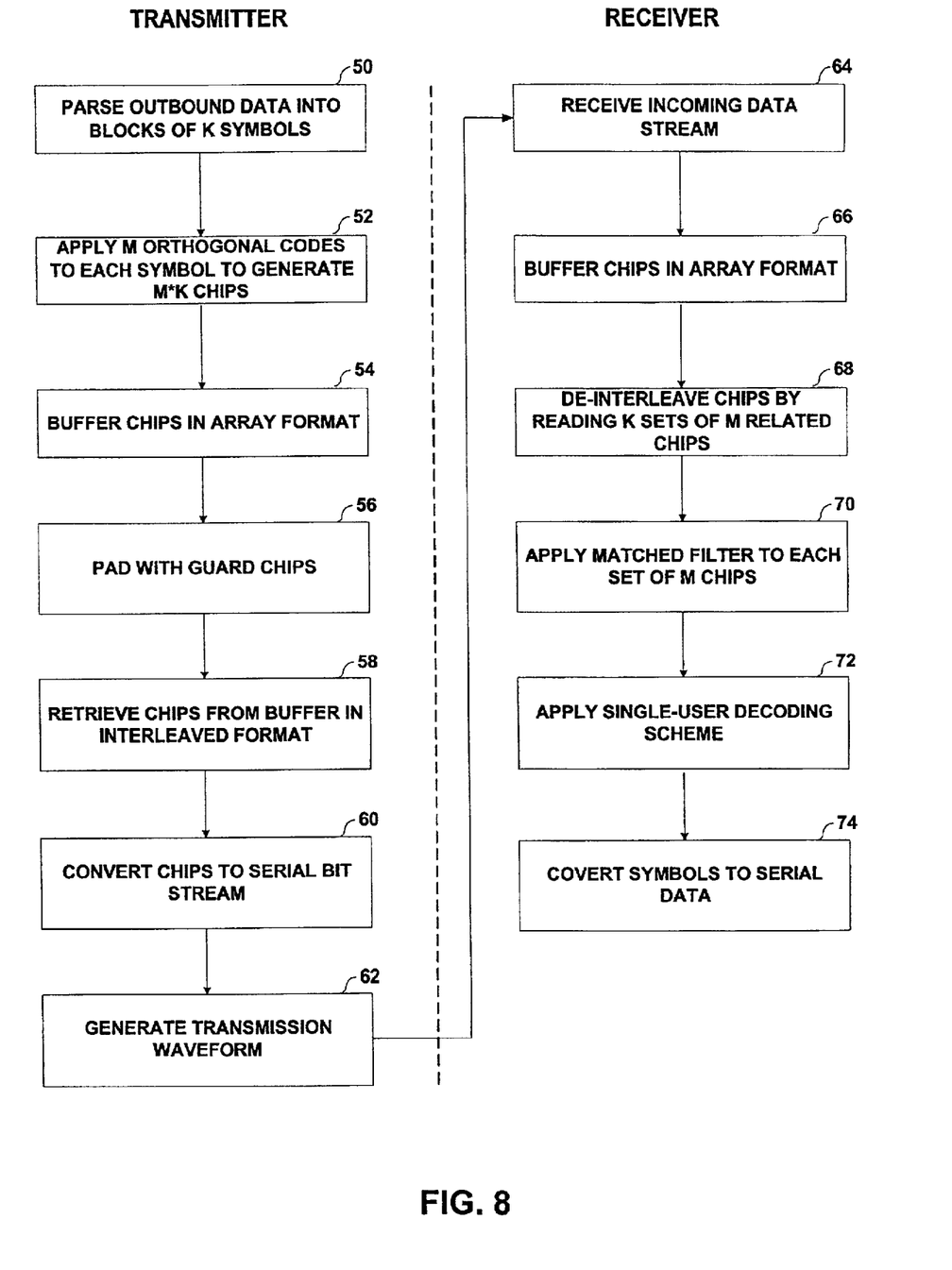
FIG. 8 is a flowchart illustrating an example mode of operation of communication system in which a transmitter and a receiver communicate using chip-interleaved block-spread communications.

FIG. 8 is a flowchart illustrating an example mode of operation of communication system 2 of FIG. 1 in which transmitter 4 and receiver 6 communicate using chip-interleaved block-spread communications. Generally, transmitter 4 parses an outbound serial data stream into blocks of K symbols (50) and applies a user-specific code of length M to each of the symbols within the blocks (52). This generates a set of M chips for each symbol, which transmitter 4 buffers in array format (54) and pads with guard chips (56).

After block-spreading the symbols, transmitter 4 extracts the chips from the buffer so as to interleave the chips for the K symbols (58). The chips that are generated from the same symbol, therefore, are temporally spaced and separated by the guard chips. In this manner, each block of K symbols produces M*(K+L) interleaved chips, where L represents the number of guard chips and M represents the maximum number of users that can be supported simultaneously. The transmitter converts the interleaved chips into a serial bit stream (60) and outputs a transmission waveform for carrying the chip-interleaved, block-spread data through the communication channel 8 to receiver 4 (62).

Receiver 6 receives the incoming data stream (64) and stores the interleaved chips in array form (66). Once all of the chips for a block of symbols have been received and stored, the receiver reads K+L subsets of the stored chips, each subset having M chips that were generated from the same symbol, thereby de-interleaving the chips (68). Receiver 4 then applies a matched filter (70) to each subset in order to separate the symbols for the multiple users based on orthogonality, and then applies a single-user decoding scheme (72) to remove channel effects and output the estimated symbols. Receiver 4 then converts the symbols into serial data (74).

Figure 9:
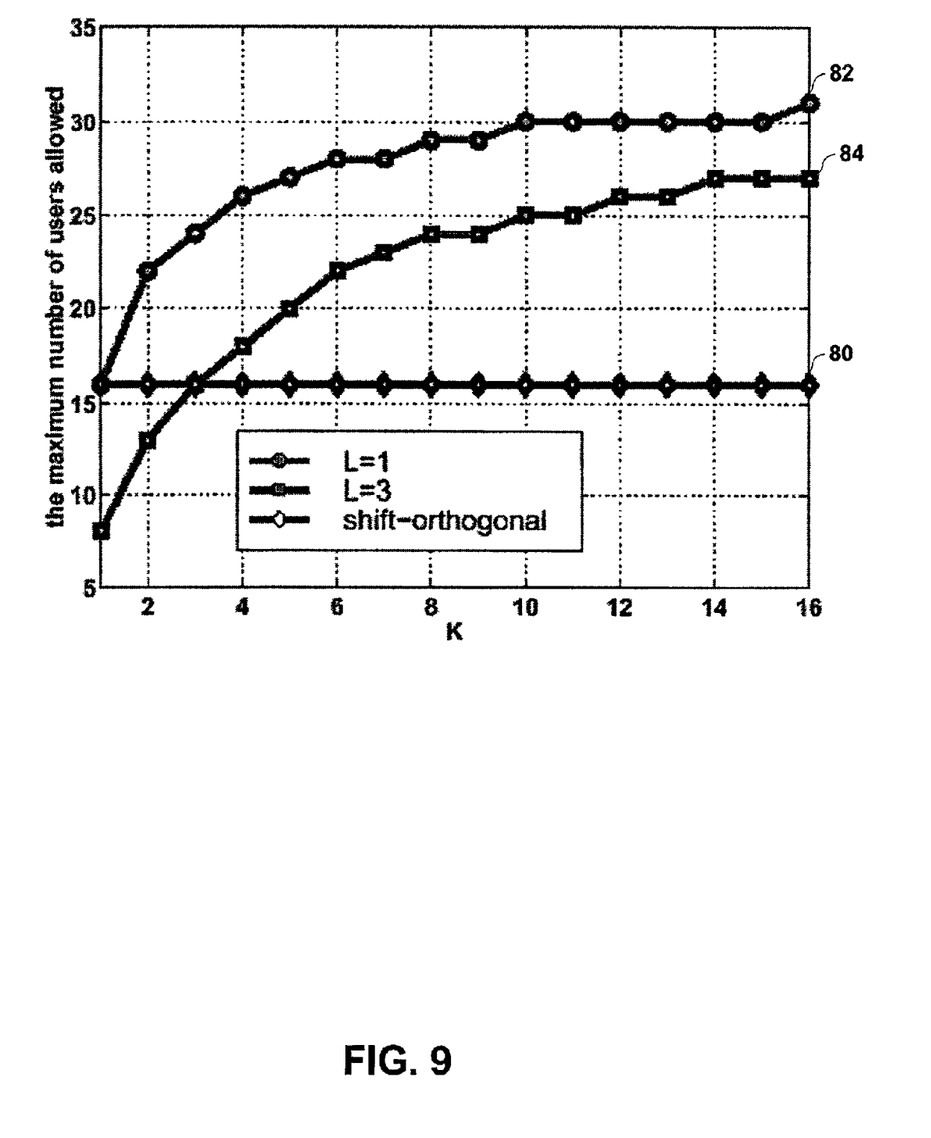
FIGS. 9, 10 and 11 are graphs illustrating modeled performance estimates of the chip-interleaved block-spreading techniques described herein.

FIG. 9 is a graph illustrating how the described chip-interleaved block-spreading (CIBS) technique described herein can increase bandwidth efficiency as the number of symbols K within a block is increased. In particular, FIG. 9 illustrates how the maximum number of supported users M increases as K increases from 2 to 16 symbols per block, where the system spreading gain is set to 33. The shift orthogonal CDMA method 80 is illustrated for comparison purposes. As a baseline, the conventional CDMA method used in practice would only allow the number of users to be up to about 25% of the system's spreading gain, which is approximately 8 users here; thus, conventional CDMA would allow even less users than the shift-orthogonal CDMA shown in FIG. 9. Plot 82 illustrates modeled results when the chip-interleaved block-spreading technique is applied to a communication channel having a length (L+1) of two chips in discrete time. Plot 84 illustrates modeled results for a communication channel when the channel length equals four chips. As can be seen from FIG. 9, the number of supported users approximately doubles the number supported by shift-orthogonal CDMA as the block size is increased from 2 to 16 blocks.

Figure 10:
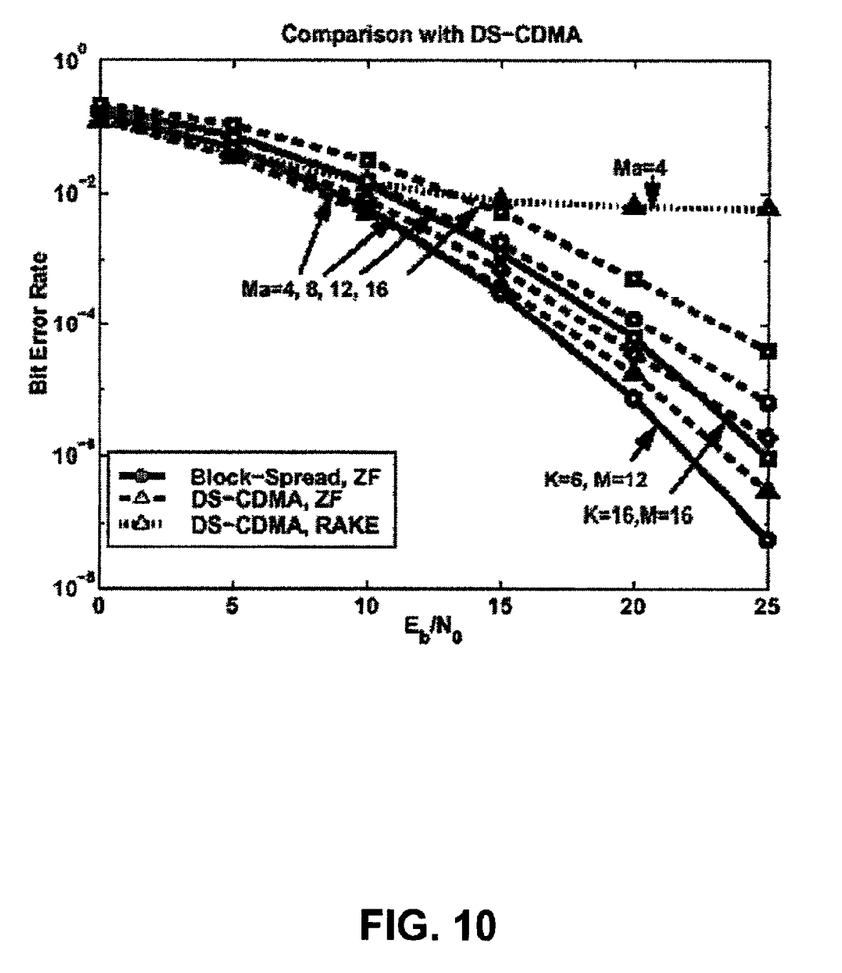
Figure 11:
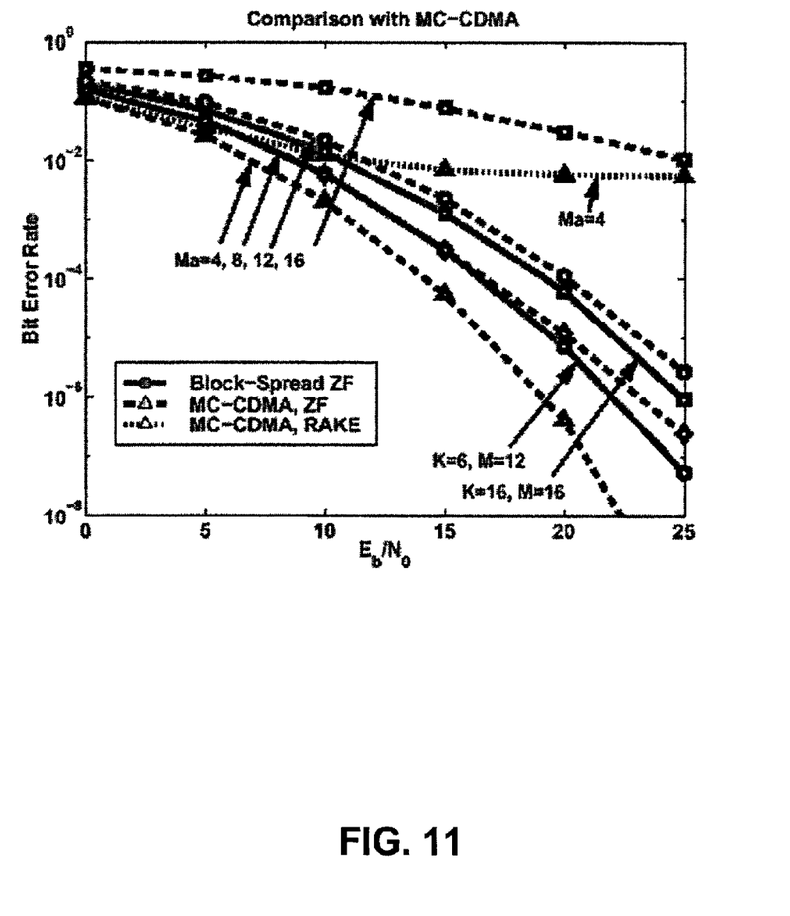

FIGS. 10 and 11 are graphs illustrating bit error rate of the CIBS technique compared to conventional multi-user detection schemes, which are often much more complex and expensive to implement. FIG. 10 illustrates the CIBS technique compared with Direct Sequence (DS) CDMA. FIG. 11 illustrates the CIBS technique compared with Multicarrier (MC) CDMA.

Various embodiments of the invention have been described. The invention provides efficient techniques for maintaining the orthogonality of user waveforms in multi-user wireless communication systems, such as systems using code division multiple access (CDMA). Unlike conventional systems in which spreading is performed on a per symbol basis, the chip-interleaved block-spreading techniques described herein spread blocks of symbols and interleave the resulting chips. The inventive techniques can be embodied in a variety of receivers and transmitters including base stations, cell phones, laptop computers, handheld computing devices, personal digital assistants (PDA's), and the like. The devices may include a digital signal processor (DSP), field programmable gate array (FPGA), application specific integrated circuit (ASIC) or similar hardware or software. These and other embodiments are within the scope of the following claims.

What is claimed is:

1. A method comprising:

applying a user-specific orthogonal spreading code to a block of K information bearing symbols to form a set of M chips for each symbol;

storing the chips in an array having M columns and K+L rows, where L is a function of a channel length of a wireless communication channel;

selectively interleaving the chips from the chip sets; and generating a transmission signal from the interleaved chips.

2. The method of claim 1, wherein the wireless communication comprises a frequency selective communication channel, and wherein applying the spreading code comprises an orthogonal spreading code selected such that the interleaved chips retain their orthogonality after passing through the frequency selective communication channel.

3. The method of claim 1, further comprising communicating the transmission signal through the wireless communication medium.

4. The method of claim 1, wherein generating the transmission signal further comprises:

padding each column of the array with L guard chips; and generating the transmission signal by reading the chips from the array in column wise fashion.

5. The method of claim 4, wherein the guard chips comprise null values.

6. The method of claim 4, wherein the guard chips are selected from a common modulation constellation.

7. The method of claim 1 further comprising:

receiving the signal; and de-interleaving the chips from the received signal.

8. The method of claim 7 further comprising separating the data according to a user.

9. The method of claim 8, wherein separating the data comprises applying a matched filter and a single-user decoding technique.

10. The method of claim 7, wherein de-interleaving the data comprises storing the chips in an array having M columns and K+L rows, wherein M represents a number of spreading codes within a set of spreading codes, and father wherein the M chips within each row of the array correspond to a common symbol.

11. The method of claim 10, wherein de-interleaving the data further comprises producing a stream of chips by reading the array in row wise fashion.

12. The method of claim 11, further comprising:

applying a matched filter to the stream of chips to separate signals from different users based on their code orthogonality and produce a stream of user-specific symbols;

applying a single-user detecting scheme to remove channel effects and output user-specific symbol estimates; and converting the stream of user-specific symbol estimates into a serial data stream.

13. A computer-readable medium having instructions thereon to cause a programmable processor to:

apply a user-specific orthogonal spreading code of length M to a block of K information-bearing symbols to form a set of M chips for each symbol; and store the chips in an array having M columns and K+L rows, where L is a function of the communication channel length;

select chips from the chip sets to produce a stream of chips in which the chips from different sets are interleaved; and generate a transmission signal from the stream of interleaved chips.

14. The computer-readable medium of claim 13, further including instructions to cause the processor to transmitting the signal through a wireless communication channel.

15. The computer-readable medium of claim 13, further including instructions to cause the processor to:

pad each column of the array with L guard chips; and generate the transmission signal by reading the chips from the array in column wise fashion.

16. A computer-readable medium having instructions to cause a processor to:

receive a signal having interleaved chips generated from a block of K information-bearing symbols;

write the interleaved chips column-wise into an may such that each row contains chips generated from the same received symbol, wherein the array has M columns and K+L rows, wherein L is a function of the communication channel length and M represents a number of spreading codes within a set of spreading codes applied to generate the signal; and produce a stream of de-interleaved chips by reading the rows of the array.

17. The computer-readable medium of claim 16, wherein the M chips within each row of the array are generated from a common received symbol.

18. The computer-readable medium of claim 16, wherein the instructions cause the processor to:

apply a matched filter to the stream of de-interleaved chips to produce a stream of user-specific symbols;

apply a single-user channel equalization and symbol detection scheme to remove channel effects and output user-specific symbol estimates; and convert the stream of user-specific symbol estimates into a serial data stream.

19. A transmitting device comprising:

a block-spreading unit to form a set of M chips for each symbol of a block of K information-bearing symbols and to produce a stream of chips in which the chips from different sets of chips are interleaved and separated by L guard chips, wherein L is a function of a channel length of a wireless communication; and a pulse shaping unit to generate a transmission signal from the stream of interleaved chips.

20. The transmitting device of claim 19, wherein the block-spreading unit comprises:

a symbol-spreading unit to generate M user-specific orthogonal spreading chips for each symbol within the block of K symbols;

a buffer to store the sets of chips; and a chip-interleaving unit to read chips from the buffer and output a stream of chips in which the chips from different sets are interleaved.

21. The transmitting device of claim 20, wherein the buffer stores the chips in an array having M columns and K+L rows, where M represents a maximum number of users.

22. The transmitting device of claim 19, wherein the buffer pads each column of the array with L guard chips.

23. The transmitting device of claim 19, wherein the chip-interleaving unit reads the chips from the array in column wise fashion.

24. The transmitting device of claim 20, wherein the transmitting device comprises a cellular phone.

25. A system comprising:

a transmitter to transmit a signal through a wireless communication channel according to interleaved chips generated from a block of K information-bearing symbols, wherein the transmitter interleaves the chips in an array having M columns and K+L rows, where L is a function of a channel length of the wireless communication channel and M represents a maximum number of users; and a receiver to receive the signal and de-interleave the chips.

26. The system of claim 25, wherein the transmitting device comprises a block-spreading unit to form a set of chips for each symbol of the block and to produce a stream of chips in which the chips from different sets are interleaved; and a pulse shaping unit to generate the signal from the stream of interleaved chips.

27. The system of claim 26, wherein the block-spreading unit comprises:

a symbol-spreading unit to generate user-specific orthogonal spreading chips codes for each symbol within the block of symbols;

a buffer to store the sets of chips in the array form; and a chip-interleaving unit to read chips from the buffer and output a stream of chips in which the chips from different sets are interleaved.

28. The system of claim 25, wherein the receiver comprises:

a block separator to store the interleaved chips column-wise into an array such that each row contains chips generated from the same received symbol with intersymbol interference, and to produce a stream of de-interleaved chips by reading the rows of the array;

a single-user detector to apply a matched filter to the stream of de-interleaved chips to produce a stream of user-specific symbols; and a single-user channel equalization and symbol detection scheme to remove channel effects and output the estimated symbols.

29. The system of claim 28, wherein the single-user detector achieves performance equivalent to a set of M single user detectors.

30. A system comprising:

a transmitter to transmit a signal according to interleaved chips generated from a block of symbols; and a receiver to receive the signal and de-interleave the chips, wherein the receiver comprises:

a block separator to store the interleaved chips column-wise into an array such that each row contains chips generated from the same received symbol with intersymbol interference, and to produce a stream of de-interleaved chips by reading the rows of the array wherein the array has M columns and K+L rows wherein L is a function of the communication channel length and M represents a number of spreading codes with a set of spreading codes applied to generate the signal;

a single-user detector to apply a matched filter to the stream of de-interleaved chips to produce a stream of user-specific symbols; and a single-user channel equalization and symbol detection scheme to remove channel effects and output the estimated symbols, wherein the single-user detector that achieves performance equivalent to a set of M single user detectors.

* * * * *

UNITED STATES PATENT AND TRADEMARK OFFICE
CERTIFICATE OF CORRECTION

PATENT NO. : 6,912,241 B2 Page 1 of 1
DATED : June 28, 2005
INVENTOR(S) : Georgios B. Giannakis et al.

It is certified that error appears in the above-identified patent and that said Letters Patent is hereby corrected as shown below:

<u>Column 8,</u>
Line 21, delete "father" and replace with -- further --.
Line 63, delete "may" and replace with -- array --.

<u>Column 10,</u>
Line 10, delete "chips".

Signed and Sealed this

Sixth Day of June, 2006

JON W. DUDAS
*Director of the United States Patent and Trademark Office*